United States Patent
Tsai et al.

(10) Patent No.: US 10,467,255 B2
(45) Date of Patent: Nov. 5, 2019

(54) METHODS AND SYSTEMS FOR ANALYZING READING LOGS AND DOCUMENTS THEREOF

(71) Applicant: Industrial Technology Research Institute, Hsinchu (TW)

(72) Inventors: Tsung-Lin Tsai, Kaohsiung (TW); Meng-Yu Lee, New Taipei (TW); Shun-Chieh Lin, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 663 days.

(21) Appl. No.: 14/982,711

(22) Filed: Dec. 29, 2015

(65) Prior Publication Data

US 2017/0169096 A1 Jun. 15, 2017

(30) Foreign Application Priority Data

Dec. 11, 2015 (TW) .............................. 104141664 A

(51) Int. Cl.
*G06F 16/35* (2019.01)
*G06F 16/28* (2019.01)
*G06F 16/93* (2019.01)

(52) U.S. Cl.
CPC ............ *G06F 16/285* (2019.01); *G06F 16/35* (2019.01); *G06F 16/93* (2019.01)

(58) Field of Classification Search
USPC ........................................................ 707/738
See application file for complete search history.

(56) References Cited

U.S. PATENT DOCUMENTS 7,155,668 B2 12/2006 Holland et al.
7,457,808 B2 11/2008 Gaussier et al.
(Continued)

FOREIGN PATENT DOCUMENTS

CN 102611785 A 7/2012
CN 103020159 A 4/2013
(Continued)

OTHER PUBLICATIONS

Taiwan Patent Office, Office Action, Patent Application Serial No. 104141664, dated Sep. 26, 2016, Taiwan.
(Continued)

*Primary Examiner* — Muluemebet Gurmu

(57) ABSTRACT

Methods for analyzing reading log and documents corresponding thereof are provided, including: acquiring reading log and documents corresponding thereto, wherein the reading log at least includes reading-related information about the documents within a predetermined period of time, selecting interesting document sets from the documents according to the reading log in each time segment, performing a document content pre-processing on the interesting document sets to determine keyword sets corresponding thereto for each time segment according to the interesting document sets, performing cluster calculation on the keyword sets to obtain topics and calculating cohesion of each topic, deleting topics with insufficient cohesion to obtain multiple high-relevance topics and classifying each high-relevance topic into one of predetermined topic classes according to the respective keyword sets of the high-relevance topics, obtaining reading statistics for each topic class and calculating multiple degrees of interest for each topic class during each time segment.

18 Claims, 8 Drawing Sheets

(56) References Cited

U.S. PATENT DOCUMENTS

| | | |
|---|---|---|
| 7,568,148 B1 | 7/2009 | Bharat et al. |
| 7,711,747 B2 | 5/2010 | Renders et al. |
| 7,720,848 B2 | 5/2010 | Guerraz et al. |
| 7,788,263 B2 | 8/2010 | Li et al. |
| 7,788,264 B2 | 8/2010 | Zhu et al. |
| 7,810,029 B2 | 10/2010 | Holland et al. |
| 7,813,919 B2 | 10/2010 | Goutte |
| 8,090,717 B1 | 1/2012 | Bharet et al. |
| 8,108,376 B2 | 1/2012 | Okamoto et al. |
| 8,225,190 B1 | 7/2012 | Bharat et al. |
| 8,234,274 B2 | 7/2012 | Guo et al. |
| 8,447,110 B2 | 5/2013 | Inagaki |
| 8,843,479 B1 | 9/2014 | Bharat et al. |
| 2002/0184267 A1* | 12/2002 | Nakao ............... G06F 17/30719 715/255 |
| 2006/0074883 A1 | 4/2006 | Teevan et al. |
| 2009/0033971 A1* | 2/2009 | Kawai ..................... G06K 7/14 358/1.13 |
| 2009/0089272 A1* | 4/2009 | Oliver ............... G06F 17/30675 |
| 2009/0192751 A1* | 7/2009 | Kamath ............. A61B 5/14532 702/104 |
| 2009/0234794 A1 | 9/2009 | Harrison |
| 2012/0330977 A1 | 12/2012 | Inagaki |
| 2017/0024423 A1* | 1/2017 | Liang ............... G06F 17/30902 |

FOREIGN PATENT DOCUMENTS

| | | |
|---|---|---|
| TW | 200846941 | 12/2008 |
| TW | 201327216 A1 | 7/2013 |

OTHER PUBLICATIONS

Ramage et al., "Characterizing Microblogs with Topic Models," Proceedings of the Fourth International AAAI Conference on Weblogs and Social Media, 2010, 8 pages, Assoication for the advancement Artificial Intelligence, US.

Hall et al., "Studying the History of Ideas Using Topic Models," EMNLP '08 Proceedings of the Conference on Empirical Methods in Natural Language Processing, Oct. 2008, 9 pages, ACM, US.

Chuang et al., "Topic Model Diagnostics: Assessing Domain Relevance via Topical Alignment," Proceedings of the 30th International Conference on Machine Learning, 2013, 9 pages, vol. 28, ACM, US.

Blei et al., "Dynamic Topic Models," ICML '06 Proceedings of the 23rd International Conference on Machine Learning, Jun. 2006, 9 pages, ACM, US.

Wang et al., "Topics over time: a non-Markov continuous-time model of topical trends," KDD '06 Proceedings of the 12th ACM SIDKDD international conference on Knowledge discovery and data mining, Aug. 2006, 10 pages, ACM, US.

* cited by examiner

METHODS AND SYSTEMS FOR ANALYZING READING LOGS AND DOCUMENTS THEREOF

CROSS REFERENCE TO RELATED APPLICATIONS

This Application claims priority of Taiwan Patent Application No. 104141664, filed on Dec. 11, 2015, the entirety of which is incorporated by reference herein.

TECHNICAL FIELD

The technical field relates generally to methods and systems for analyzing documents, and more particularly to methods and systems for analyzing reading log and documents corresponding thereto.

BACKGROUND

Recently, with the development of the Internet and the growing popularity of broadband networks, the network services currently available on the Internet are growing. As applications regarding the "browsing" activities in the World Wide Web become more and more popular, network service providers want to collect and analyze users through browsing behavior events, such as clicking traffic, web browsing information, site visits time, and so on, in order to detect their browsing behavior intentions, so as to provide related services that are more in line with each user's needs.

However, a variety of current event analysis of users browsing behavior cannot assist system administrators to understand the trends of interest in each document product classes for all of the users.

It is therefore a desire to provide methods and systems for determining each user's browsing or reading trends of different topic classes.

SUMMARY

Methods and systems for analyzing reading logs and documents corresponding thereto are provided.

In one exemplary embodiment, a method for analyzing a reading log and documents corresponding thereto is provided. The method comprises the steps of: acquiring a reading log and documents corresponding thereto, wherein the reading log at least includes reading-related information about the documents within a predetermined period of time; selecting a plurality of interesting document sets from the documents in each time segment of the predetermined period of time according to the reading log, each of the interesting document sets corresponding to one of the time segments of the predetermined period of time; performing a document content pre-processing on the interesting document sets to determine keyword sets corresponding to the interesting document sets; performing a cluster calculation on the keyword sets to obtain topics and calculating cohesion of each topic; deleting topics with insufficient cohesion among the topics obtained to obtain a plurality of high-relevance topics and classifying each high-relevance topic into one of a plurality of predetermined topic classes by comparing the respective keyword sets of the high-relevance topics with a plurality of keyword sets of the predetermined topic classes; obtaining reading statistics for each predetermined topic class and calculating a plurality of degrees of interest for each predetermined topic class during each time segment; and analyzing a reading trend on each predetermined topic class according to changes in the degrees of interest.

Another exemplary embodiment of a system for analyzing reading log and documents corresponding thereto comprises a reading log extractor, an interesting document filter, a document pre-processor, a topic cluster generator, a topic classifier and combiner, a degree of interest normalizer and a reading trend analyzer. The reading log extractor acquires a reading log and documents corresponding thereto, wherein the reading log at least includes reading-related information about the documents within a predetermined period of time. The interesting document filter, which is coupled to the reading log extractor, selects a plurality of interesting document sets from the documents in each time segment of the predetermined period of time according to the reading log, each of the interesting document sets corresponding to one of the time segments of the predetermined period of time. The document pre-processor, which is coupled to the interesting document filter, performs a document content pre-processing on the interesting document sets to determine keyword sets corresponding to the interesting document sets. The topic cluster generator, which is coupled to the document pre-processor, performs a cluster calculation on the keyword sets to obtain topics, calculates cohesion of each topic and deletes topics with insufficient cohesion among the topics obtained to obtain a plurality of high-relevance topics. The topic classifier and combiner, which is coupled to the topic cluster generator, classifies each high-relevance topic into one of a plurality of predetermined topic classes by comparing the respective keyword sets of the high-relevance topics with a plurality of keyword sets of the predetermined topic classes. The degree of interest normalizer, which is coupled to the topic classifier and combiner, obtains reading statistics for each predetermined topic class and calculates a plurality of degrees of interest for each predetermined topic class during each time segment. The reading trend analyzer, which is coupled to the degree of interest normalizer, analyzes a reading trend on each predetermined topic class according to changes in the degrees of interest.

Methods for analyzing reading log and documents corresponding thereto may be practiced by the systems for analyzing reading log and documents corresponding thereto which are hardware or firmware capable of performing particular functions and may take the form of program code embodied in a tangible media. When the program code is loaded into and executed by an electronic device, a processor, a computer or a machine, the electronic device, the processor, the computer or the machine becomes an apparatus for practicing the disclosed method.

BRIEF DESCRIPTION OF THE DRAWINGS

The application will become more fully understood by referring to the following detailed description with reference to the accompanying drawings, wherein.

DETAILED DESCRIPTION

This description is made for the purpose of illustrating the general principles of the application and exemplary embodiments will be described in detail with reference to accompanying drawings so as to be easily realized by a person having ordinary knowledge in the art. The inventive concept may be embodied in various forms without being limited to the exemplary embodiments set forth herein.

Embodiments of the application provide systems and methods for analyzing reading log and documents corresponding thereto, which can analyze reading history log on the website, based on all the user's reading and action history, to identify the topics by clustering keywords of the documents and then classifying the topics to analyze different topic classes of degrees of interest for different users at different times, so as to determine each user's reading trends in different topic classes.

Figure 1:
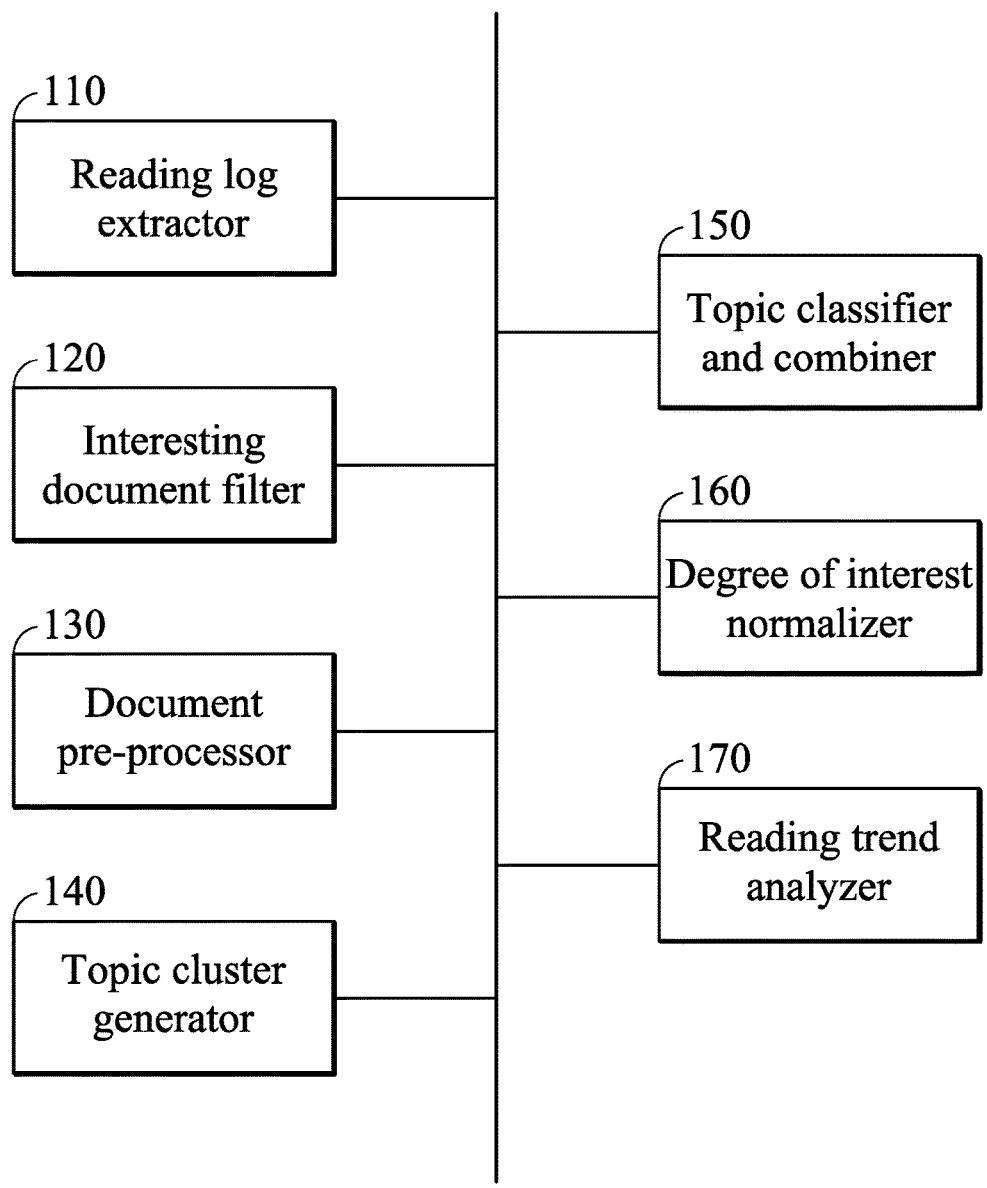
FIG. 1 is a schematic diagram illustrating an exemplary embodiment of a system for analyzing reading log and documents corresponding thereto of the application.

FIG. 1 is a schematic diagram illustrating an exemplary embodiment of a system 100 for analyzing reading log and documents corresponding thereto of the application. As shown in FIG. 1, the system 100 for analyzing reading log and documents corresponding thereto (hereinafter referred to as system 100) comprises at least a reading log extractor 110, an interesting document filter 120, a document pre-processor 130, a topic cluster generator 140, a topic classifier and combiner 150, a degree of interest normalizer 160 and a reading trend analyzer 170. The reading log extractor 110 acquires a reading log and documents corresponding thereto, wherein the reading log at least includes reading-related information about the documents within a predetermined period of time. The interesting document filter 120, which is coupled to the reading log extractor 110, selects a plurality of interesting document sets from the documents in each time segment of the predetermined period of time according to the reading log, wherein each of the interesting document sets corresponds to one of the time segments of the predetermined period of time. The document pre-processor 130, which is coupled to the interesting document filter 120, performs a document content pre-processing on the interesting document sets to determine keyword sets corresponding to the interesting document sets. The topic cluster generator 140, which is coupled to the document pre-processor 130, performs a cluster calculation on the keyword sets to obtain topics, calculates cohesion of each topic and deletes topics with insufficient cohesion among the topics obtained to obtain a plurality of high-relevance topics. The topic classifier and combiner 150, which is coupled to the topic cluster generator 140, classifies each high-relevance topic into one of the predetermined topic classes by comparing the respective keyword sets of the high-relevance topics with a plurality of keyword sets of predetermined topic classes. The degree of interest normalizer 160, which is coupled to the topic classifier and combiner 150, obtains reading statistics for each predetermined topic class and calculates a plurality of degrees of interest for each predetermined topic class during each time segment. The reading trend analyzer 170, which is coupled to the degree of interest normalizer 160, determines or analyzes a reading trend on each predetermined topic class according to changes in the degrees of interest, the details of which are described below.

It should be understood that, in this embodiment, each of the elements may be a device having a corresponding function, which may have the appropriate hardware circuits or elements to perform the corresponding function, however, the device is not to have entity limit, which can also be a virtual device having program and software with respective functions or a device having capabilities for processing and running the program and software. The manner of operations of the respective elements can further refer to the following description of the methods. Specifically, the system 100 can control operations of the reading log extractor 110, the interesting document filter 120, the document pre-processor 130, the topic cluster generator 140, the topic classifier and combiner 150, the degree of interest normalizer 160 and the reading trend analyzer 170 to perform the method for analyzing reading log and documents corresponding thereto of the application, which will be discussed further in the following paragraphs.

Figure 2:
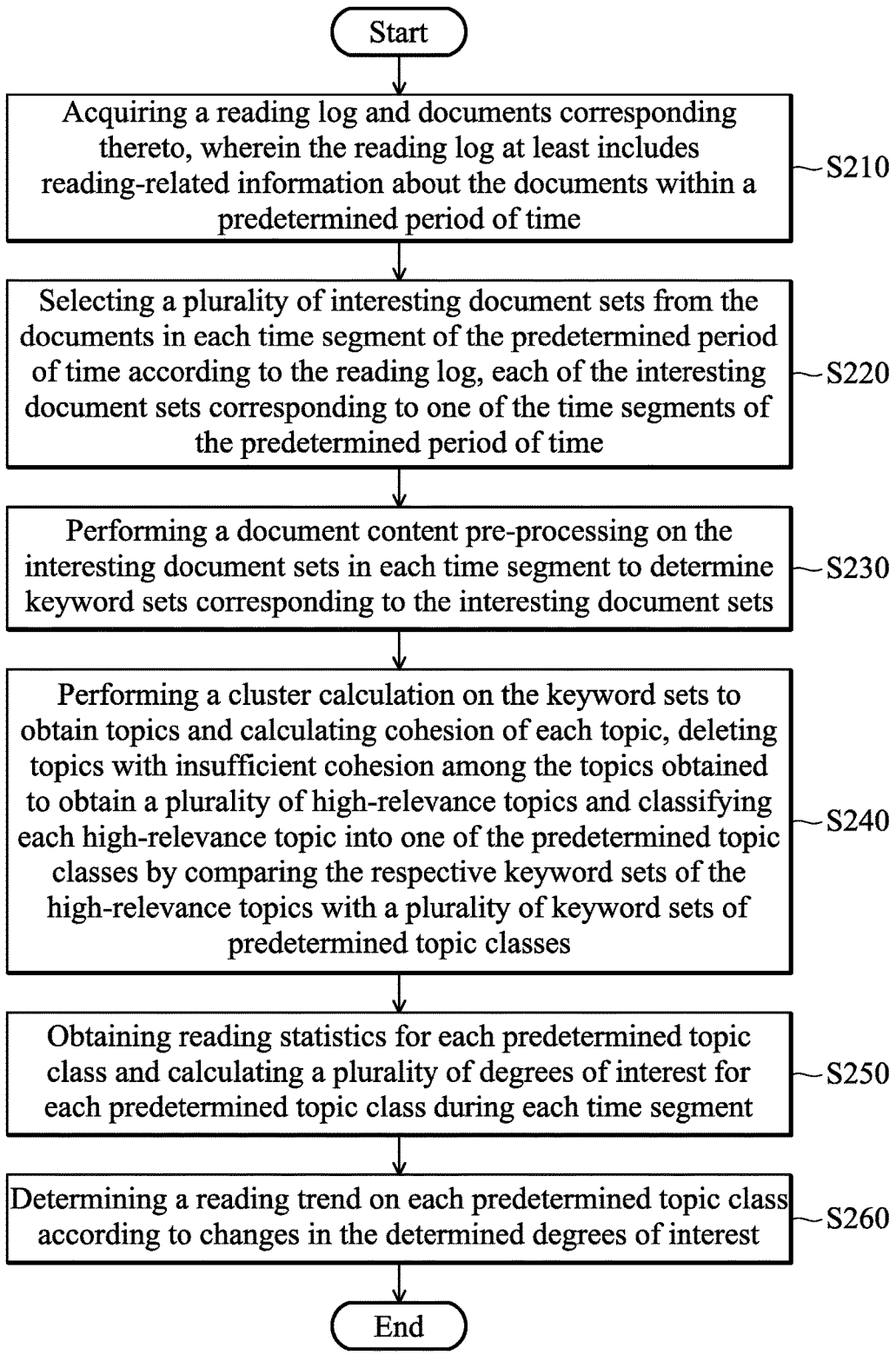
FIG. 2 is a flowchart of a method for analyzing reading log and documents corresponding thereto according to an embodiment of the application.

FIG. 2 is a flowchart of a method for analyzing reading log and documents corresponding thereto according to an embodiment of the application. The method for analyzing reading log and documents corresponding thereto of the application can be applied to the system 100 as shown in FIG. 1.

First, in step S210, the system 100 acquires a reading log and documents corresponding thereto through the reading log extractor 110, wherein the reading log at least includes reading-related information about the documents within a predetermined period of time (for example: one day, week, month, etc.), such as reading time, read action, content and so on. To be more specific, when users perform operations on the system, the system records the user's movements and related information such as relevant information related to the time point, the action (reading documents, searching, logging in . . . ) as well as the action-related information, such as document information (document header, document contents, search string, etc.), and automatically save then to a reading log. For example, the reading log may include web server records, the system records, the history record repository and so on, but it is not limited thereto. In one embodiment, the reading log is a web access log, which may include user data (for example: user account code, login time, login location, etc.), the user's behavior-related Information (for example: reading documents, searching, logging in, etc.), the user's reading-related information (for example: the name of the document being read, and reading-time-related records, etc.) and time stamp information for the log and so on.

Subsequently, in step S220, the system 100 performs determination of degrees of interest for the documents being read to select a plurality of interesting document sets from the documents in each time segment of the predetermined period of time according to the reading log through the interesting document filter 120, wherein each of the interesting document sets corresponds to one of the time segments of the predetermined period of time. Determination of degrees of interest for the documents being read may include determinations of interesting reading time and the number of interesting readings. The step of selecting the interesting document sets from the documents may comprise the steps of filtering out uninterested reading-related information among the reading-related information about the documents to obtain filtered reading-related information, calculating an interesting reading time and the number of interesting readings for each document based on the filtered reading-related information and determining whether each document belongs to the interesting document sets based on the interesting reading time and the number of interesting readings of the document. In one embodiment, the determination of interesting reading time can be performed by calculating the time for each document being read by different users in a specific time interval, using a median number calculation for calculating the interesting reading time for each single document (for example: a document with a reading time more than a first median*0.8 and less than a third median*2.2). The reading time of a document which is presented in the interesting reading time will be recorded as an interesting reading. Thus, each document corresponds to one of the interesting readings. Then, the total number of interesting readings in this time segment is referred to as the number of interesting readings for the time segment. Thereafter, interesting documents for a specific time segment can be obtained based on the number of interesting readings for each document. For example, if the number of interesting readings of a document is ranked in the top 80% (or the first n-position) among all the documents in the time segment, the document can be regarded as an interesting document for the time segment.

Therefore, the method for analyzing a reading log and documents corresponding thereof of the present application can gather statistics about the interesting reading time, the number of interesting readings, and so on, of each document in each time segment to determine whether a specific document is an interesting document, and then only take the interesting documents to calculate and classify, thereby reducing the amount of calculation and filtering the noise out.

After filtering out the interesting document sets from the documents in each time segment of the predetermined period of time, in step S230, the system 100 performs steps for feature enhancement of document topics to determine topics and respective keyword sets for each time segment according to the interesting document sets for each time segment through the document pre-processor 130. In one embodiment, the aforementioned steps for feature enhancement of document topics may further include obtaining a plurality of keywords from each document, paragraphing the document, calculating the frequency at which the keywords appear in each paragraph to calculate a plurality of importance-weightings corresponding to all of the paragraphs and determining at least one key paragraph according to the importance-weightings, and generating the keyword sets for the document based on the keywords within the key paragraph.

Specifically, after the document pre-processor 130 picks the keyword sets from each document, it processes the document by paragraph, and compares the number of occurrences of keywords within each paragraph and divides by the length of the paragraph to obtain the importance of this paragraph for the document. Then, the document pre-processor 130 takes the keywords of several important paragraphs to generate the keyword sets of the document. By doing so, the keyword sets of enhanced topic for the document can be obtained.

Figure 3:
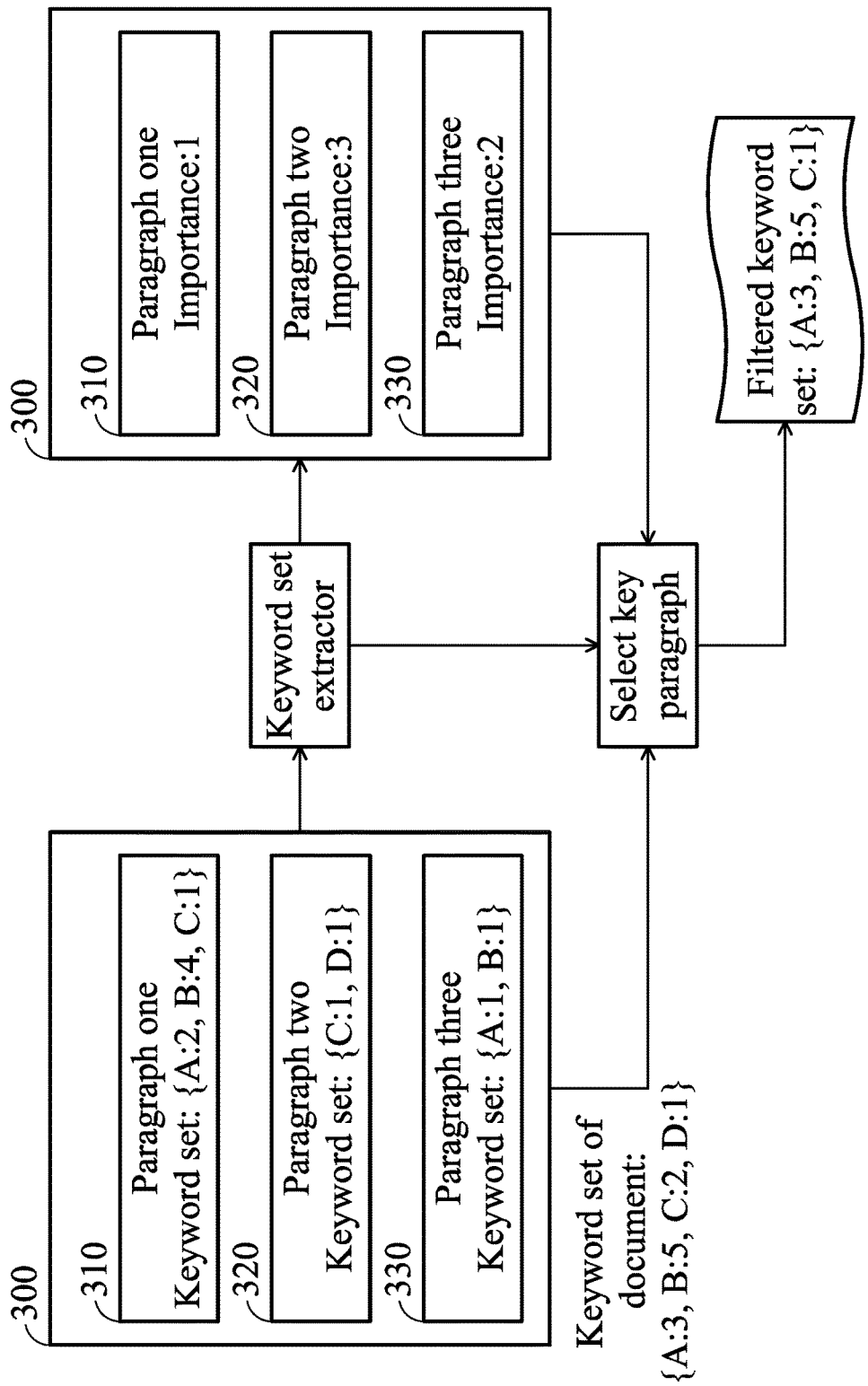
FIG. 3 is a schematic diagram illustrating an exemplary embodiment of document topics' feature enhancement and keyword set generation of the application.

FIG. 3 is a schematic diagram illustrating an exemplary embodiment of document topics' feature enhancement and keyword set generation of the application. As shown in FIG. 3, in this embodiment, it is assumed that the keyword sets of the document 300 includes keywords A, B, C and D, whose keyword sets are {A: 3, B: 5, C: 2, D: 1}, respectively, which represent that the keyword A appears three times, the keyword B appears five times and so on. According to the method of the present application, the document pre-processor 130 divides the document 300 into paragraphs 310, 320 and 330, and calculates separately for each paragraph a frequency at which the keywords appear in each paragraph to get keyword sets of paragraphs 310, 320 and 330, which are {A: 2, B: 4, C: 1}, {C: 1, D: 1} and {A: 1, B: 1}, respectively. Then, the number of times a keyword appears is divided by the length of each paragraph to obtain an estimated importance value (weightings) of each paragraph of the document. In this embodiment, it is assumed that the importance-weightings of the paragraphs 310-330 are ranked 1, 3 and 2, respectively, which indicate that the most important paragraph is the paragraph 310, followed by the paragraph 330, and the least important paragraph is the paragraph 320. Thus, the system 100 selects the key paragraphs according to the importance ranking (e.g., in this embodiment, the paragraphs 310 and 330 are selected as the key paragraphs), and then uses the keyword sets of these key paragraphs to generate a keyword set representing the enhanced keyword set of the document 300, and obtains the keyword sets of the document 300 as {A: 3, B: 5, C: 1}.

The step of obtaining the keywords or the keyword sets from each document may further include keywords and word frequency (TFIDF) processing, in which the word frequency (TFIDF) processing performs word-break or word segmentation operation on the document based on its architecture, such as speech, grammar, language (such as Chinese or English), punctuation, hyphenation and so on, to obtain a keyword set from each document. Note that the TFIDF processing may be implemented by a variety of TFIDF techniques known to those skilled in the art, and so the details are omitted.

Thus, according to method for analyzing a reading log and documents corresponding thereto of the application, the keywords and the TFIDF processing can be applied to calculate the importance of each paragraph of the document and only the important paragraphs will be used to represent the keyword sets of the document, thereby making the keyword sets obtained more focused on the topic of the document.

After obtaining its keyword set, in step S240, the system 100 performs a cluster calculation on the keyword sets to obtain topics and calculates the cohesion of each topic, and then deletes topics with insufficient cohesion among the topics obtained to obtain a plurality of high-relevance topics through the topic cluster generator 140 and classifies each high-relevance topic into one of the predetermined topic classes by comparing the respective keyword sets of the high-relevance topics with a plurality of keyword sets of predetermined topic classes. The keyword set may comprise the keywords and a weighting value of each keyword for the topic. Cohesion of each topic may be calculated by using the keyword set and the weighting value as a basic document vector and then multiplying the word frequency (TFIDF) of the keywords within the keyword set of the document by the corresponding weighting value in the vector so as to generate the vector value of the document. Then, the Euclidean distances between all documents in a topic may be calculated to find the average value thereof. The average value is the cohesion of this topic. A topic whose value of cohesion is less than a threshold value is not considered as a valid topic, it will be discarded. After all the topics with insufficient cohesion have been deleted, multiple valid topics can be obtained. These valid topics are referred to as high-relevance topics. For example, suppose a keyword set for a topic is set to [key_A: 0.9, key_B: 0.8, key_C: 0.7, key_D: 0.6] after calculating, where the word frequency collection of keyword set of the document A is set to [key_A: 2, key_B: 4, key_C: 2], the word frequency collection of keyword set of the document B is set to [key_B: 4, key_D: 2], the vector of the document A is V(A)=[key_A: 1.8, key_B: 3.2, key_C: 1.4, key_D: 0] and the vector of the document B is V(B)= [key_A: 0, key_B: 3.2, key_C: 0, key_D: 1.2], the cohesion of the topic can be calculated by following formula:

$$\frac{V(A) \cdot V(B)}{|V(A)||V(B)|}$$

Then, the topic classifier and combiner 150 performs topic classification and combination to compare the respective keyword sets of the high-relevance topics with a plurality of keyword sets of predetermined topic classes to classify each high-relevance topic into one of the predetermined topic classes. To be more specific, the method for analyzing reading log and documents corresponding thereto of the application can automatically classify the topics into several topic classes, computes the degree of similarity of the respective keyword sets between a first high-relevance topic of the high-relevance topics and a predetermined topic class of the predetermined topic classes, and when the degree has exceeded a predetermined threshold degree, classifies the first high-relevance topic corresponding to the keyword set being compared into the first predetermined topic class. Furthermore, the keyword set of the first predetermined topic class can be automatically updated using the respective keyword set of the first high-relevance topic after classifying the first high-relevance topic into the first predetermined topic class.

Subsequently, in step S250, the system 100, through the degree of interest normalizer 160, obtains reading statistics for each predetermined topic class for the user and calculates a plurality of degrees of interest for each predetermined topic class during each time segment, and then, in step S260, determines, through the reading trend analyzer 170, a reading trend on each predetermined topic class according to changes in the determined degrees of interest. For example, in one embodiment, the trend of degrees of interest at different time segments can be divided into at least one of the following options: the trend of going from being interested to being uninterested in documents of the predetermined topic class, the trend of staying interested in documents of the predetermined topic class, and the trend of going from being uninterested to being interested in documents of the predetermined topic class, and so on. Thus, by analyzing user trends of degree of interest variation for each topic class in different time periods, information regarding topics or document product classes which are most interested and whether there is a change in the document product class of interest for each user can be obtained, thus providing follow-up application, such as suggesting documents with the same document product class or pushing product-related advertising, and so on.

Specifically, the application may serves each document cluster as a topic, and each class may have zero or more high-relevance topics that appeared in each time segment. That is, there is a relevance among time segment, class and topic. Thereafter, the keyword sets of the clusters after clustering will be compared with those in the existing classes, and if the ratio of the recurring of the keyword sets of a cluster has exceeded a threshold value, documents within the cluster are classified into the class compared. Then, the cluster uses the keyword sets to calculate relation with other topics in the same class, and if the calculated result has exceeded the threshold value, the cluster is referred to as a continuation of the previous topics. Topic classification and combination are detailed in the following paragraphs with reference to the following section in FIGS. 4 to 6.

Figure 4:
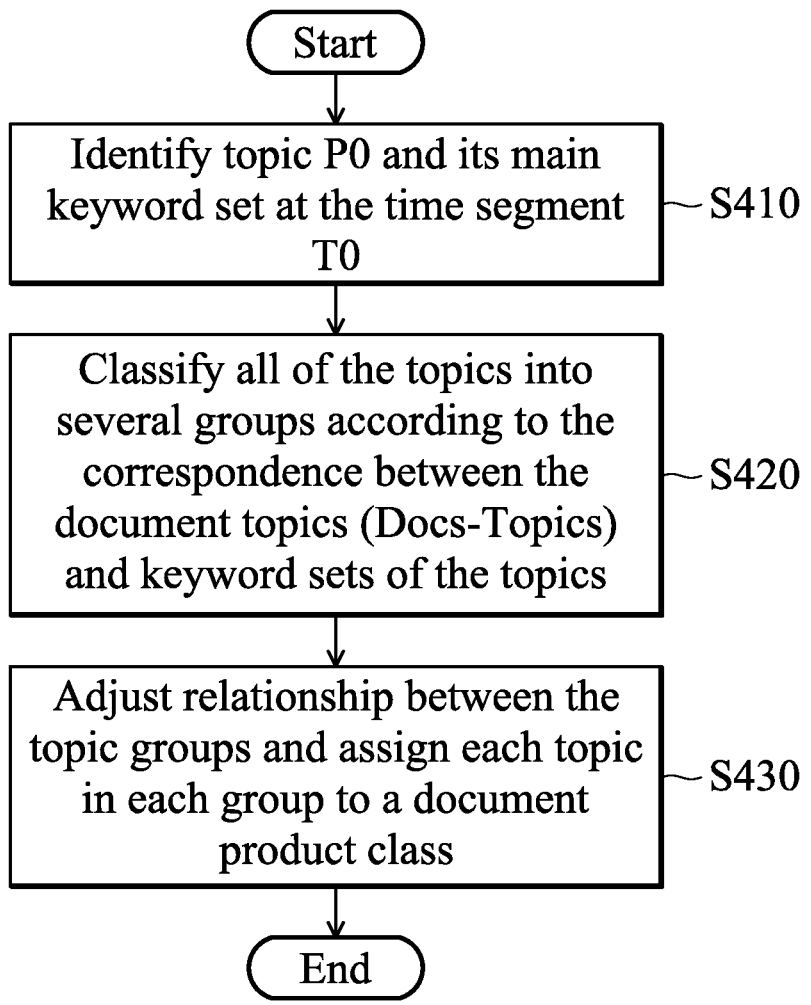
FIG. 4 is a flowchart of a method for analyzing reading log and documents corresponding thereto to establish initial models of document product classes according to another embodiment of the application.

FIG. 4 is a flowchart of a method for analyzing reading log and documents corresponding thereto to establish initial models of document product classes according to another embodiment of the application. The method for analyzing reading log and documents corresponding thereto of the application can be applied to the system 100 of FIG. 1. For example, in this embodiment, the method can be performed by the topic classifier and combiner 150 as shown in FIG. 1.

First, at the first time segment T0, topic (Topics (P0)) and its main keyword set of the time segment T0 are first identified (step S410). Then, all of the topics are classified into several groups according to the correspondence between the document topics (Docs-Topics) and keyword sets of the topics (step S420). After that, the relationship between the topic groups are adjusted and each topic in each group is assigned to a document product class (step S430).

Figure 5:
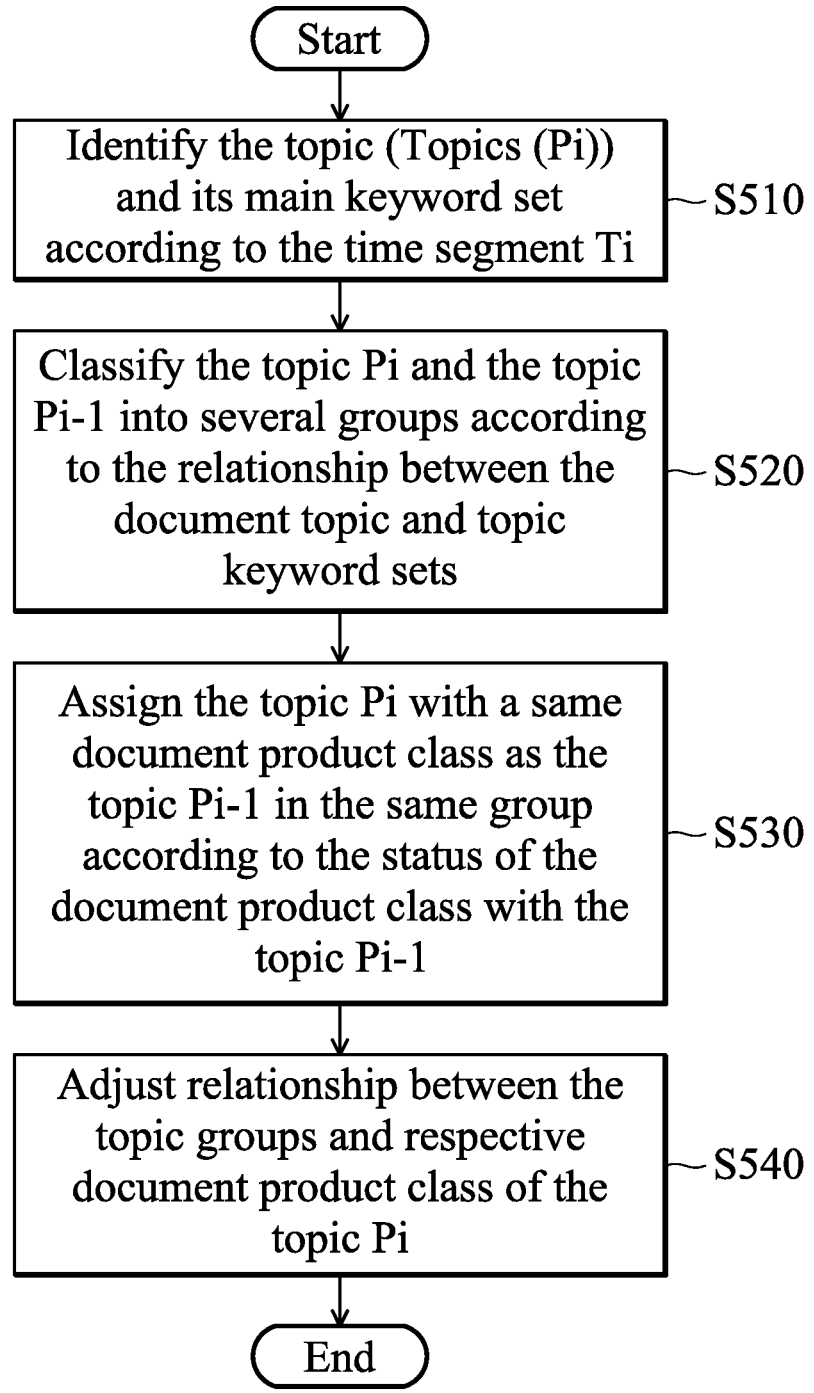
FIG. 5 is a flowchart of a method for analyzing reading log and documents corresponding thereto to provide model growth process of follow-up interval (T1~TM) according to another embodiment of the application.

FIG. 5 is a flowchart of a method for analyzing reading log and documents corresponding thereto to provide model growth process of follow-up time segments (T1~TM) according to another embodiment of the application. The method for analyzing reading log and documents corresponding thereto of the application can be applied to the system 100 of FIG. 1. For example, in this embodiment, the method can be performed by the topic classifier and combiner 150 as shown in FIG. 1.

First, according to the time segment Ti, the topic (Topics (Pi)) and its main keyword set are identified (step S510). That is, the topic classifier and combiner 150 can respectively identify the topic (Topics (Pi)) and its main keyword set for each of the time segments T1~TM according to the previous method. Next, the topic Pi and the topic Pi-1 related in time are classified into several groups according to the relationship between the document topic and topic keyword sets (step S520). Subsequently, the topic Pi is assigned with a same document product class as the topic Pi-1 in the same group according to the status of the document product class with the topic Pi-1 (step S530). Thereafter, relationship between the topic groups and respective document product class of the topic Pi are adjusted (step S540).

Figure 6:
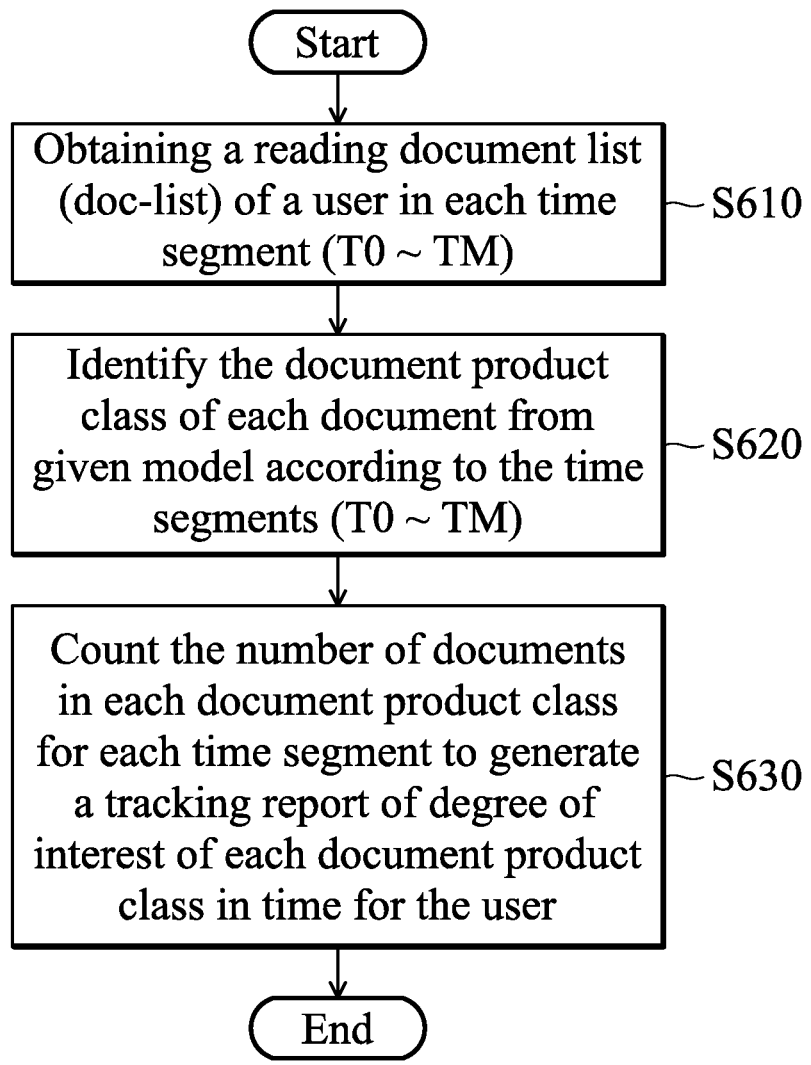
FIG. 6 is a flowchart of a method for analyzing reading log and documents corresponding thereto to generate time-interesting-degree tracking reports for the document product classes based on user reading log according to another embodiment of the application.

FIG. 6 is a flowchart of a method for analyzing reading log and documents corresponding thereto to generate a tracking report of degree of interest in time for the document product classes based on the user's reading log, according to another embodiment of the application. The method for analyzing the reading log and documents corresponding thereto of the application can be applied to the system 100 of FIG. 1. For example, in this embodiment, the method can be performed by the degree of interest normalizer 160 and the reading trend analyzer 170 as shown in FIG. 1.

First, a user code can be entered to query for obtaining the reading document list (doc-list) of the user in each time segment (T0~TM) (step S610). Then, according to the time segments (T0~TM) to identify the document product classes or topic classes of each document from the model (step S620). After the document product classes or topic classes of each document are identified, count the number of documents in each document product class for each time segment, to generate a tracking report of degree of interest of each document product class in time for the user (step S630). For example, in one embodiment, the tracking report of degree of interest of each document product class in time for the user may indicate the trend of degree of interest of each document product class at different time segments, wherein the trend of degrees of interest at different time segments can be divided into at least one of the following options: the trend of going from being interested to being uninterested in documents of the predetermined topic class, the trend of staying interested in documents of the predetermined topic class, and the trend of going from being uninterested to being interested in documents of the predetermined topic class, and so on.

Figure 7:
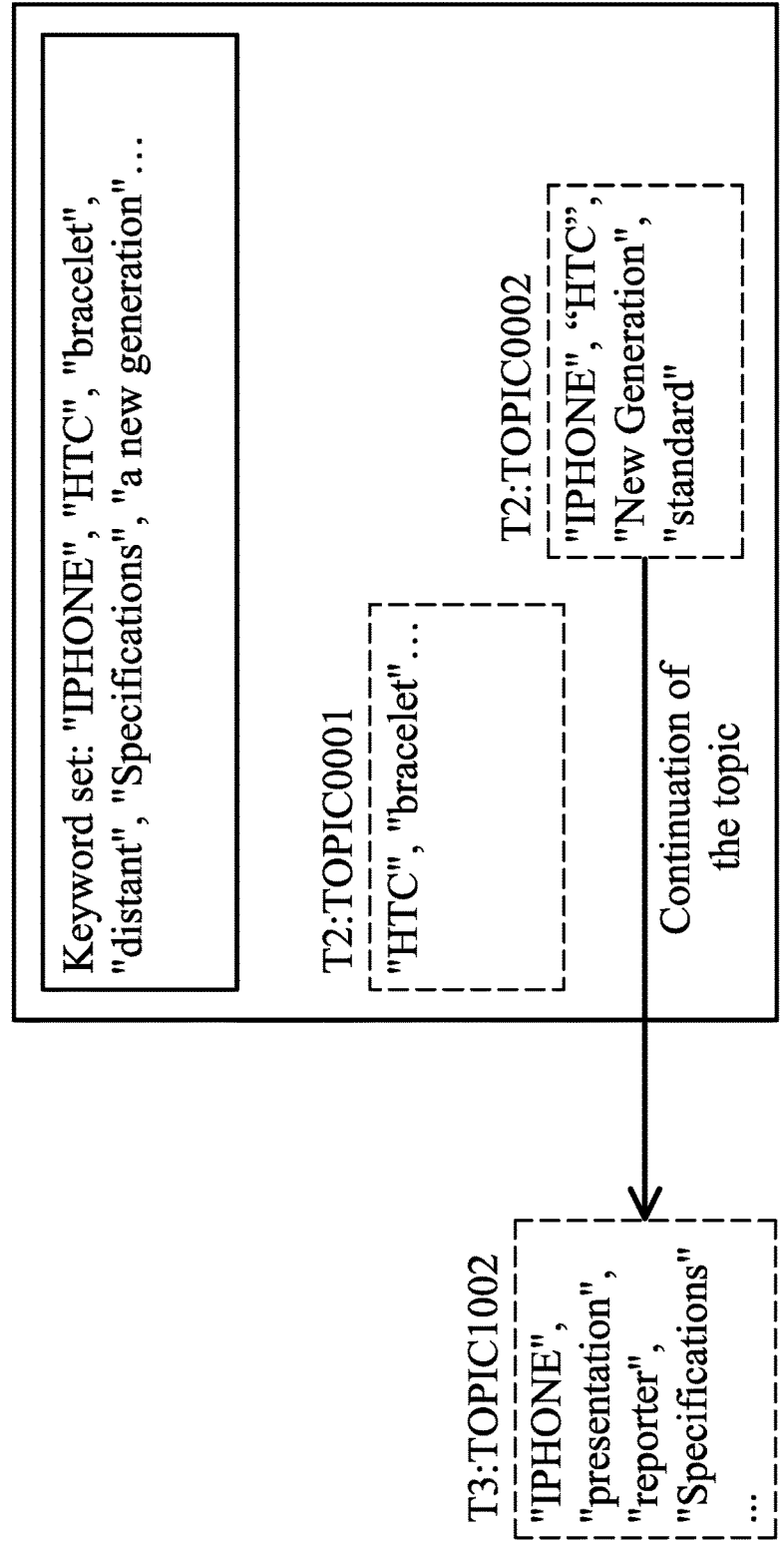
FIG. 7 is a schematic diagram illustrating an exemplary embodiment of topic continuity determination of the application.

Following embodiments are given to illustrate detail steps of the method of the application and the present invention is not limited thereto. FIG. 7 is a schematic diagram illustrating an exemplary embodiment of determining topic continuity of the application. As shown in FIG. 7, in this embodiment, it is assumed that there is a document product class with the name "Mobile Devices" class and its keyword set includes the keywords "IPHONE", "HTC", "bracelet", "distant" "Specifications", "a new generation" and other keywords, wherein the topic TOPIC0001 at the time T2 contains a keyword set including the keywords "HTC", "bracelet" and other keywords while another topic TOPIC0002 contains a keyword set including keywords "IPHONE", "New Generation", "standard" and other keywords. At a time T3 which is after the time T2, the topic TOPIC1002 of a document contains a keyword set including the keywords "IPHONE", "presentation", "reporter", "Specifications" and other keywords, as the degree of similarity of keyword sets between the topic TOPIC1002 and the "Mobile Devices" class (e.g., 75%) is greater than a predetermined threshold degree (e.g., 70%), the topic TOPIC1002 will be classified into the "Mobile Devices" class, and the keyword set of the topics TOPIC1002 will be combined into the previous keyword set of the "Mobile Devices" class. In addition, because the topic TOPIC0002 at the time T2 contains the keyword set including the keywords "IPHONE", "New Generation", "Specifications" and other keywords, and the degree of similarity of keyword sets between the topic TOPIC0002 and the topic TOPIC1002 is also greater than the predetermined threshold degree, this indicates that the topics TOPIC0002 and TOPIC1002 are relevant. Therefore it can be determined as a continuation of the topic, and the two topics are related, which may indicate that the user maintains an interest in the documents of the "Mobile Devices" class. Thus, the method for analyzing reading logs and documents corresponding thereto of the present application can track the topic so that it can still identify new topics and previous topics belonging to the same class, even if this topic does not appear for some time, thereby identifying the relevance between topics appeared in different periods and further tracking the trend of degree of interest in each topic class at each time segment for each user.

Figure 8:
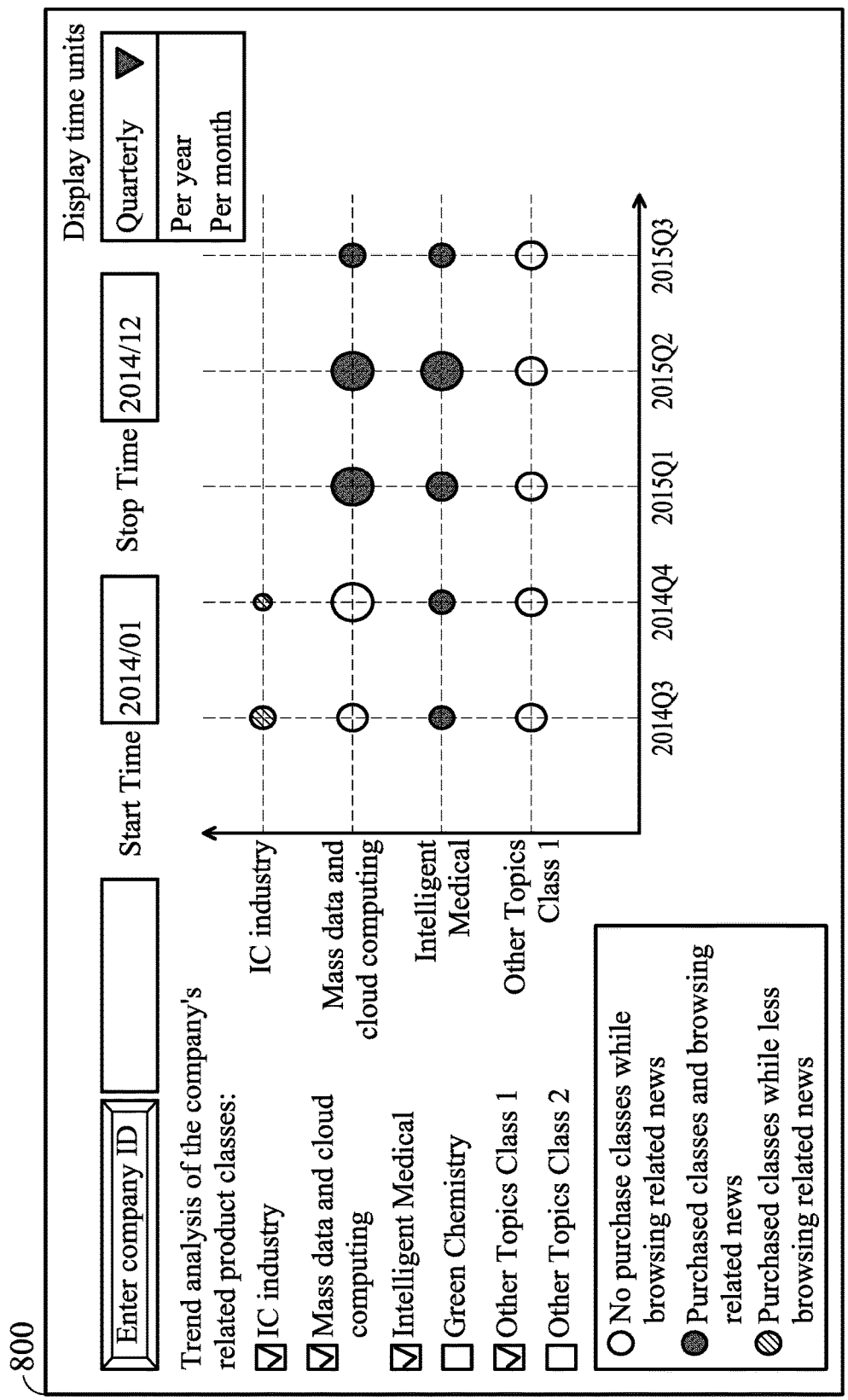
FIG. 8 is a schematic diagram illustrating an exemplary embodiment of a user interface of the application.

In some embodiments, the reading trend analyzer 170 may provide a user interface, which can graphically show an analysis result of the reading trend in the predetermined period of time, wherein the reading trend indicates a way of or a trend of changing in document interest for each predetermined topic class. FIG. 8 is a schematic diagram illustrating an exemplary embodiment of a user interface of the application. As shown in FIG. 8, the user interface module 800 displays the relevant trends in a company's observations, in which the vertical axis represents the degree of interest corresponding to each document class and the horizontal axis represents units in year 2014 at different time intervals (different seasons). As shown in FIG. 8, the degree of interest is represented as a circle: the higher the degree of interest, the greater the radius of the circle. For example, it is observed from FIG. 8 that the degree of interest of this company in the "IC industry" class becomes more and more small, indicating that the user is progressing from being interested to being uninterested in documents in the "IC industry" class, but the user's interest in the "Intelligent medical" class continues to increase, indicating that the company has the trend of going from being uninterested to being interested in documents of the "Intelligent medical" class. Accordingly, by the user interface provided by the reading trend analyzer 170, the reading trend of each user can be easily determined.

Methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application specific logic circuits.

While the application has been described by way of example and in terms of exemplary embodiment, it is to be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A method for analyzing reading logs and documents corresponding thereto, comprising:
  acquiring reading logs related to webpages and documents corresponding thereto, wherein the reading logs at least includes reading-related information about the documents within a predetermined period of time and the reading-related information at least includes an interesting reading time and a number of interesting readings;
  selecting a plurality of interesting document sets from the documents in each time segment of the predetermined period of time according to the interesting reading times and the number of interesting readings of the documents in the reading logs, each of the interesting document sets corresponding to one of the time segments of the predetermined period of time;

performing a document content pre-processing on the interesting document sets to determine keyword sets corresponding to the interesting document sets;

performing a cluster calculation on the keyword sets to obtain topics and calculating cohesion of each topic;

deleting topics with insufficient cohesion among the topics obtained to obtain a plurality of high-relevance topics and classifying each high-relevance topic into one of a plurality of predetermined topic classes by comparing the respective keyword sets of the high-relevance topics with a plurality of keyword sets of the predetermined topic classes;

obtaining reading statistics for documents of each predetermined topic class and calculating a plurality of degrees of interest for documents of each predetermined topic class during each time segment; and determining a reading trend on each predetermined topic class according to changes in the degrees of interest, wherein the document content pre-processing step further comprises the steps of performing the following steps on each document of the interesting document sets:

obtaining a plurality of keywords;

paragraphing the document and calculating a frequency at which the keywords appear in each paragraph to calculate a plurality of importance-weightings corresponding to all of the paragraphs and determining at least one key paragraph according to the importance-weightings; and generating the set of keywords for the document based on the keywords within the at least one key paragraph.

2. The method as claimed in claim 1, wherein the step of selecting the interesting document sets further comprises:

filtering out uninterested reading-related information among the reading-related information about the documents to obtain filtered reading-related information;

calculating the interesting reading time and the number of interesting readings for each document based on the filtered reading-related information; and determining whether each document belongs to the interesting document sets based on the interesting reading time and the number of interesting readings of the document;

wherein the document is classified to the interesting document sets when the interesting reading time of the document has exceeded a time threshold value and the number of interesting readings of the document has exceeded a frequency threshold value.

3. The method as claimed in claim 1, wherein the step of classifying each high-relevance topic into one of the predetermined topic classes further comprises:

when a degree of similarity of keyword sets between a first high-relevance topic of the high-relevance topics and a first predetermined topic class of the predetermined topic classes has exceeded a predetermined threshold degree, classifying the first high-relevance topic corresponding to the keyword set being compared into the first predetermined topic class.

4. The method as claimed in claim 3, further comprising:

automatically updating the keyword set of the first predetermined topic class using the respective keyword set of the first high-relevance topic after classifying the first high-relevance topic into the first predetermined topic classes.

5. The method as claimed in claim 3, further comprising:

after classifying the first high-relevance topic into the first predetermined topic class, comparing the degree of similarity of keyword sets between the first high-relevance topic and a keyword set of a first topic within the first predetermined topic class; and relating the first high-relevance topic to the first topic when the degree of similarity of keyword sets between the first high-relevance topic and the first topic has exceeded a predetermined threshold degree.

6. The method as claimed in claim 1, wherein the step of determining the reading trend on each predetermined topic class according to changes in the degrees of interest further comprises:

gathering a total number of readings for each predetermined topic class in each time segment;

determining a degree of interest for each predetermined topic class in each time segment according to the total numbers of readings for all of the predetermined topic classes; and determining the reading trend on each predetermined topic class based on the changes in the degrees of interest for each predetermined topic class.

7. The method as claimed in claim 6, wherein the reading trend of each predetermined topic class comprises at least one of: the trend of going from being interested to being uninterested in the predetermined topic class, the trend of staying interested in the predetermined topic class, and the trend of going from being uninterested to being interested in the predetermined topic class.

8. The method as claimed in claim 7, further comprising:

providing a user interface to graphically show a result of the reading trend determined in the predetermined period of time;

wherein the reading trend indicates a trend of changing in document interest for each predetermined topic class.

9. A system, implemented by a processor, for analyzing reading logs and documents corresponding thereto, comprising:

a reading log extractor, acquiring reading logs related to webpages and documents corresponding thereto, wherein the reading logs at least includes reading-related information about the documents within a predetermined period of time and the reading-related information at least includes an interesting reading time and a number of interesting readings;

an interesting document filter coupled to the reading log extractor, selecting a plurality of interesting document sets from the documents in each time segment of the predetermined period of time according to the interesting reading times and the number of interesting readings of the documents in the reading logs, each of the interesting document sets corresponding to one of the time segments of the predetermined period of time;

a document pre-processor coupled to the interesting document filter, performing a document content pre-processing on the interesting document sets to determine keyword sets corresponding to the interesting document sets;

a topic cluster generator coupled to the document pre-processor, performing a cluster calculation on the keyword sets to obtain topics, calculating cohesion of each topic and deleting topics with insufficient cohesion among the topics obtained to obtain a plurality of high-relevance topics;

a topic classifier and combiner coupled to the topic cluster generator, classifying each high-relevance topic into one of a plurality of predetermined topic classes by comparing the respective keyword sets of the high-relevance topics with a plurality of keyword sets of the predetermined topic classes;

a degree of interest normalizer coupled to the topic classifier and combiner, obtaining reading statistics for documents of each predetermined topic class and calculating a plurality of degrees of interest for documents of each predetermined topic class during each time segment; and a reading trend analyzer coupled to the degree of interest normalizer, determining a reading trend on each predetermined topic class according to changes in the degrees of interest, wherein for each document of the interesting document sets, the document pre-processor further obtains a plurality of keywords, paragraphs the document and calculates a frequency at which the keywords appear in each paragraph to calculate a plurality of importance-weightings corresponding to all of the paragraphs and determines at least one key paragraph according to the importance-weightings, and generates the set of keywords for the document based on the keywords within the at least one key paragraph.

10. The system as claimed in claim 9, wherein the interesting document filter further filters out uninterested reading-related information among the reading-related information about the documents to obtain filtered reading-related information, calculates the interesting reading time and the number of interesting readings for each document based on the filtered reading-related information and determines whether each document belongs to the interesting document sets based on the interesting reading time and the number of interesting readings of the document, wherein a document is classified to the interesting document sets when the interesting reading time of the document has exceeded a time threshold value and the number of interesting readings of the document has exceeded a frequency threshold value.

11. The system as claimed in claim 9, wherein the topic classifier and combiner further classifies a first high-relevance topic of the high-relevance topics corresponding to the keyword set being compared into a first predetermined topic class of the predetermined topic classes when a degree of similarity of keyword sets between the first high-relevance topic and the first predetermined topic class has exceeded a predetermined threshold degree.

12. The system as claimed in claim 11, wherein the topic classifier and combiner further automatically updates the keyword set of the first predetermined topic class using the respective keyword set of the first high-relevance topic after classifying the first high-relevance topic into the first predetermined topic classes.

13. The system as claimed in claim 11, wherein the topic classifier and combiner further computes the degree of similarity of keyword sets between the first high-relevance topic and a keyword set of a first topic within the first predetermined topic class after classifying the first high-relevance topic into the first predetermined topic class and relates the first high-relevance topic to the first topic when the degree of similarity of keyword sets between the first high-relevance topic and the first topic has exceeded a predetermined threshold degree.

14. The system as claimed in claim 11, wherein the degree of interest normalizer further gathers a total number of readings for each predetermined topic class in each time segment, determines a degree of interest for each predetermined topic class in each time segment according to the total numbers of readings for all of the predetermined topic classes, and determines the reading trend on each predetermined topic class based on the changes in the degrees of interest for each predetermined topic class.

15. The system as claimed in claim 14, wherein the reading trend of each predetermined topic class comprises at least one of: the trend of going from being interested to being uninterested in the predetermined topic class, the trend of staying interested in the predetermined topic class, and the trend of going from being uninterested to being interested in the predetermined topic class.

16. The system as claimed in claim 9, wherein the reading trend analyzer further provides a user interface to graphically show a result of the reading trend determined in the predetermined period of time, wherein the reading trend indicates a trend of changing in document interest for each predetermined topic class.

17. The method as claimed in claim 1, wherein the reading trend for each predetermined topic class is one of going from being interested to being uninterested in documents of the predetermined topic class, staying interested in documents of the predetermined topic class, and going from being uninterested to being interested in documents of the predetermined topic class.

18. The system as claimed in claim 9, wherein the reading trend for each predetermined topic class is one of going from being interested to being uninterested in documents of the predetermined topic class, staying interested in documents of the predetermined topic class, and going from being uninterested to being interested in documents of the predetermined topic class.

* * * * *